United States Patent
Shinohara et al.

(10) Patent No.: US 10,435,321 B2
(45) Date of Patent: Oct. 8, 2019

(54) STIRRER FOR GLASS MANUFACTURE

(71) Applicant: TANAKA KIKINZOKU KOGYO K.K., Chiyoda-ku, Tokyo (JP)

(72) Inventors: Tetsuo Shinohara, Isehara (JP); Tsutomu Naganuma, Isehara (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 427 days.

(21) Appl. No.: 15/117,415

(22) PCT Filed: Feb. 25, 2014

(86) PCT No.: PCT/JP2014/054419
§ 371 (c)(1),
(2) Date: Aug. 8, 2016

(87) PCT Pub. No.: WO2015/128924
PCT Pub. Date: Sep. 3, 2015

(65) Prior Publication Data
US 2016/0347638 A1 Dec. 1, 2016

(51) Int. Cl.
*C03B 5/187* (2006.01)
*B01F 7/00* (2006.01)
*B01F 7/18* (2006.01)

(52) U.S. Cl.
CPC ........ *C03B 5/1875* (2013.01); *B01F 7/00033* (2013.01); *B01F 7/00258* (2013.01); *B01F 7/18* (2013.01); *C03B 5/187* (2013.01)

(58) Field of Classification Search
CPC ... C03B 4/187; C03B 4/1875; B01F 7/00033; B01F 7/00258; B01F 7/18
(Continued)

(56) References Cited

U.S. PATENT DOCUMENTS

| | | | |
|---|---|---|---|
| 2012/0180529 A1* | 7/2012 | Singer | B01F 7/00125 65/135.3 |
| 2013/0227993 A1 | 9/2013 | Singer | |
| 2015/0003191 A1* | 1/2015 | Takagi | B01F 15/00 366/343 |

FOREIGN PATENT DOCUMENTS

| CN | 201825839 U | 5/2011 |
|---|---|---|
| DE | 4440703 A1 | 5/1996 |

(Continued)

OTHER PUBLICATIONS

Extended Search Report for EP patent application No. 14883693.5, dated Dec. 11, 2017.
(Continued)

*Primary Examiner* — Marc C Howell
(74) *Attorney, Agent, or Firm* — Orrick, Herrington & Sutcliffe LLP; Joseph A. Calvaruso; K. Patrick Herman

(57) ABSTRACT

The present invention provides a stirrer for manufacturing glass including a stirrer shaft and a multi-staged rod-shaped stirrer blade fixed so as to penetrate through the stirrer shaft. This stirrer blade is a hollow cylindrical body including: a cylinder obtained by seam welding of two opposing sides of a flat plate made, for example, from strengthened platinum containing platinum or a platinum alloy as a matrix and metallic oxide dispersed in the plate; and a disk welded to an entire circumference of both ends of the cylinder and made from an identical material, and it penetrates so that a weld line crosses a center axis of the stirrer shaft, and is fixed so that a locus of an end portion of the blade forms a spiral shape. In addition, the rod-shaped stirrer blade has a core layer showing a dispersed structure that exists in a cross-sectional structure at a fixing portion with the stirrer shaft and does not receive heat effect resulting from fixing. The present invention is effective in stirring of molten glass (Continued)

having high viscosity, and has enhanced stirring operation and improved durability against deformation and damage.

16 Claims, 5 Drawing Sheets

(58) Field of Classification Search
USPC .......................................................... 366/343
See application file for complete search history.

(56) References Cited

FOREIGN PATENT DOCUMENTS

| JP | 07223823 A | 8/1995 |
|----|----|----|
| JP | 2003034539 A | 2/2003 |
| JP | 2004149338 A | 5/2004 |
| JP | 2011115854 A | 6/2011 |
| JP | 2013184845 A | 9/2013 |
| JP | 2013193096 A | 9/2013 |
| WO | WO 2011/020625 A1 | 2/2011 |
| WO | WO 2013/133084 A1 | 9/2013 |

OTHER PUBLICATIONS

International Search Report for PCT/JP2014/054419, dated Jun. 10, 2015.

* cited by examiner

Shaft

Stirrer blade

Single spiral

Double spiral

STIRRER FOR GLASS MANUFACTURE

TECHNICAL FIELD

The present invention relates to a stirrer for manufacturing glass, which is used to stir and homogenize glass in a molten state. In particular, it relates to a stirrer for manufacturing glass suitable to stir molten glass having high temperatures or high viscosity.

BACKGROUND ART

In manufacturing processes for various glass products, a glass raw material, which has been formulated and mixed, is melted, and the glass in the molten state is stirred to homogenize its component and uniformize the index of refraction, and then, is formed to obtain a glass product. There has been a demand for glass products having uniform quality and free from defect (striae, bubbles, and so on), and in such situation, the stirring process is particularly important in these glass manufacturing processes.

In general, the stirring process for molten glass is performed by inserting a stirrer for manufacturing glass into a molten glass tank, and rotating it. This stirrer for manufacturing glass is configured such that a stirrer shaft (hereinafter, also simply referred to as a shaft) serving as a rotating shaft is provided with a stirrer blade (hereinafter, also simply referred to as a blade). There are some known modes of the shape of a blade provided to the shaft. For example, these known modes include one having plural rod-shaped bodies serving as blades and protrudingly joined to the shaft in a multi-stage manner as illustrated in FIG. 5 (see PTL 1), one having a plate material joined spirally around the outer periphery of the shaft as illustrated in FIG. 6 (see PTL 2), and one having a flange-shaped protruding portion formed spirally around the outer periphery of the shaft as illustrated in FIG. 7. These different types of stirrers are used depending on shape or size of the stirring tank, or properties or quality required for molten glass to be processed.

CITATION LIST

Patent Literature

PTL 1: Japanese Patent Laid-Open Publication No. 2004-149338
PTL 2: Japanese Patent Laid-Open Publication No. 2003-34539

SUMMARY OF INVENTION

Technical Problem

In recent years, various demands have been made for glass products such as liquid crystal display glass, and a large number of product types of glass have been developed to meet these demands. Such glass includes glass having high viscosity in a molten state, and glass melted at temperatures higher (1600° C. or higher) than those for conventional glass. Thus, there is a concern as to whether the conventional stirrer is effective in the stirring processing for such specific molten glass.

In the stirring processing for molten glass, it is necessary to form a flow state suitable for the molten glass to homogenize the molten glass, and thus, it is necessary to enhance stirring operation according to an increase in viscosity of the molten glass. Furthermore, the increases in viscosity and temperature of molten glass lead to an increase in load that the blade has to carry. This is because the torque value necessary to obtain the appropriate stirring state increases with an increase in viscosity of molten glass, and this increase in the toque value also increases mechanical load that the blade has to carry. In addition, the increase in temperature of molten glass leads to a fact that ambient temperatures are brought close to the heat resistant temperature of constituent materials of the stirring shaft, which serves as a factor of softening the materials. In combination with the effect of increase in the torque value described above, this softening of materials leads to deformation of the blade.

Here, there is a problem that the enhancement of the stirring operation conflicts with a reduction in mechanical load. In other words, in order to enhance the stirring operation, it is possible to take an idea of causing the blade to be more likely to dynamically contact the molten glass, for example, by increasing the surface area of the blade or increasing the number of blades. For example, in a case of a stirrer having spiral blade illustrated in FIG. 6, it is possible to improve the stirring operation by using a blade (double spiral) having a double-line configuration in place of a blade (single spiral) having a single-line configuration. However, increasing the number of blades as described above means an increase in resistance body against molten glass, causing torque values to increase at the time of stirring.

Consequently, it is an object of the present invention to provide a stirrer for manufacturing glass, which is useful particularly in stirring molten glass having high viscosity, and which has enhanced stirring operation and reduced load at the time of stirring, and is less likely to suffer deformation or damage.

Solution to Problem

The present invention, which solves the problem described above, provides a stirrer for manufacturing glass including a stirrer shaft and a multi-staged rod-shaped stirrer blade fixed so as to penetrate through the stirrer shaft, in which the rod-shaped stirrer blade is a hollow cylindrical body including: a cylinder obtained by seam welding of two opposing sides of a flat plate made from strengthened platinum or a strengthened platinum alloy containing platinum or a platinum alloy as a matrix and metallic oxide dispersed in the plate; and a disk welded to an entire circumference of both ends of the cylinder and made from an identical material, the rod-shaped stirrer blade penetrates through the stirrer shaft so that a weld line due to the seam welding crosses a center axis of the stirrer shaft, and is fixed so that a locus of an end portion of the blade forms a spiral shape, and the rod-shaped stirrer blade has a core layer showing a dispersed structure that exists in a cross-sectional structure at a fixing portion with the stirrer shaft and does not receive heat effect resulting from fixing.

The stirrer for manufacturing glass according to the present invention has a rod-shaped blade arranged spirally as illustrated in FIG. 1. In a case where molten glass is stirred with a stirrer having a rod-shaped blade, molten glass generally passes through spaces between blades. According to the present inventors, in a case where a rod-shaped blade is arranged spirally with respect to molten glass having a high viscosity to stir it, molten glass does not pass through spaces between blades, and a stirring state of molten glass that is analogous to that caused by a plate-shaped blade having a spiral shape (FIG. 6) is caused. The molten glass flow with this spiral blade is a spiral flow directing upward of the molten glass tank. This spiral flow reaches the upper surface of molten glass, and then, flows downward along the wall surface of the molten glass tank, and hence, it is possible to move molten glass from bottom to top and then from top to bottom of the molten glass tank, which is a significantly favorable stirring state.

Furthermore, according to the present inventors, by arranging the rod-shaped blade spirally, it is possible to obtain more effective stirring state than that obtained with a conventional blade having a plate material formed into a spiral shape, and furthermore, it is possible to reduce torque at the time of stirring. This is because, although molten glass basically does not pass through intervals between blades, there is a portion for molten glass to partially pass through. It is considered that, at this portion where molten glass passes through, molten glass flow is sheared, and a flow in a direction different from the spiral flow described above is created. In addition, it is considered that, with this local shearing of the molten glass flow, it is possible to obtain an effective stirring state with low load.

In the present invention, the rod-shaped blade needs to be fixed at equal intervals and at equal angles spirally. Here, preferably, interval angles between respective blades are set in a range of 20° to 70°. More preferably, these interval angles are set in a range of 25° to 45°. Although the interval angles between respective blades may differ from each other, it is preferable to fix these blades at equal angles in one direction. Furthermore, it is preferable that fixation spaces between blades in the axial direction of the shaft are set in a range of 10 to 20 mm regardless of the diameter of a rod-shaped blade. More preferably, these spaces are set to 15 mm. This is because, in a case where spaces between blades are set to each upper limit or higher, molten glass passes through intervals between blades, and the targeted flow state for molten glass cannot be reproduced.

It is preferable that the number of stages, which corresponds to the number of blades arranged in the longitudinal direction of the shaft, is set to be 4 stages to 10 stages. If the number is less than 4 stages, stirring operation is weak, and the number exceeding 10 stages is excluded from the viewpoint of material cost. Furthermore, the size (depth) of the stirring tank is also taken into consideration to set this number of stages.

In the present invention, the rod-shaped blade is penetrated through the shaft, and is fixed. In other words, regarding the number of blades in each stage, two rod-shaped blades are symmetrically fixed with respect to the shaft. The reason that the blade is penetrated through the shaft as described above is to enhance fixation strength between the blade and the shaft. In other words, in a case where the blade is butted against the shaft so as to be fixed, fixing is generally performed by welding. In this case, most of the material structure is more likely to change at a butting portion of the blade (FIG. 2(a)). The tensile strength, at high temperatures, of the material structure (heat-affected zone) formed by welding is reduced, and hence, the joining portion may break when used. Furthermore, in the first place, fixation strength is low in the case of butting joining. On the other hand, in the case where the blade is penetrated through the shaft, it is possible to achieve sufficient fixation strength by itself. Here, in the case of fixation according to the present invention, it is sufficient to apply welding that closes spaces existing at the joining portion (base portion of the blade) between the blade and the shaft (FIG. 2(b)). Even if welding portions are limited as described above, it is possible to gain strength at the joining portion between the blade and the shaft, and it is also possible to eliminate erosion by molten glass.

Furthermore, a constituent material of the blade is strengthened platinum or a strengthened platinum alloy. Strengthened platinum or a strengthened platinum alloy is a dispersion strengthened alloy in which metallic oxide is dispersed in platinum or a platinum alloy. Strengthened platinum or a strengthened platinum alloy is excellent in a high-temperature strength property, in particular, is excellent in high-temperature creep strength, and hence, is preferable as a structural material of a device for manufacturing glass, which is used in high-temperature environment. Here, preferable dispersed grains for strengthened platinum or a strengthened platinum alloy include a valve metal oxide having high melting points such as a zirconium oxide and an yttrium oxide, a rare earth metallic oxide such as a samarium oxide, and the like. It is preferable to use dispersed grains having the grain diameter of less than 1 μm, in particular, the grain diameter of approximately several tens of nm, and it is preferable to set the amount of dispersion to be several mass % or lower. In addition, preferably, platinum is used as a matrix, or in the case of a platinum alloy, a platinum-rhodium alloy (for example, platinum-5 to 30 mass % of rhodium alloy) or a platinum-gold alloy (for example, platinum-5 mass % of gold alloy) is used as a matrix.

The blade is a hollow cylindrical body formed by welding a cylinder to a disk, this cylinder being obtained by rolling up a flat plate made from the strengthened platinum or the strengthened platinum alloy described above and seam welding two opposing sides of the flat plate, and this disk being made from the same material and welded to the entire circumference of both ends of the cylinder. The hollow body is employed from the viewpoint of cost and weight of material. It is preferable to set the thickness of the flat plate made from strengthened platinum or a strengthened platinum alloy to 1.5 mm or thicker.

As for fixing of the stirrer blade to the shaft, in order to reduce a contacting pressure with glass at the time of rotating the stirrer, this fixing is performed so as to penetrate through the stirrer shaft so that the weld line made through seam welding at the time of manufacturing the blade crosses the center axis of the stirrer shaft.

In the strengthened platinum or strengthened platinum alloy, which is a dispersion strengthened material and forms a constituent material of the blade, a grain dispersed structure which is a strengthened structure disappears due to melting and solidification during fixation, for example, through welding. This heat-affected structure exhibits reduced tensile strength at high temperatures, and serves as a cause that breaks at the fixing portion between the blade and the shaft. Thus, in the present invention, it is required that, in a cross-sectional structure at the fixing portion of the blade with the stirrer shaft, there exists a core layer showing a dispersed structure that is not affected by heat resulting from fixing. By leaving the core layer at the joining portion of the blade, it is possible to maintain high temperature strength (creep strength) of strengthened platinum or a strengthened platinum alloy, and it is possible to use the blade without deformation or breakage even if stirring action is performed with the number of rotations being several rotations to ten-something rotations per minute in molten glass having high viscosity.

It is preferable that the thickness of this core layer is 0.1 mm or higher on average. This is because, if the thickness is less than or equal to this value, high temperature strength (creep strength) of strengthened platinum or a strengthened platinum alloy cannot be maintained. The thicker the core layer is, the more preferable, however it is preferable to control the thickness to be 1.0 mm or less to secure strength at the time of fixing. More preferably, the thickness of the core layer is set in a range of 0.2 to 0.8 mm.

As described above, by penetrating the blade through the shaft to fix them, it is possible to obtain joining strength between them, whereby allowing the blade length of the blade to be greater. It is preferable to set the blade length of the blade to be 150 to 600% of the diameter of the shaft, and the blade length may be relatively freely set. Although the blade length of the blade can be set according to viscosity of molten glass or the diameter of the blade, it is more preferable that the blade length is set to be 200 to 500% of the diameter of the shaft in a case where the viscosity of molten glass is approximately set in a range of 200 to 400 Pa·s.

It should be noted that it is preferable to use strengthened platinum or a strengthened platinum alloy for constituent materials of the shaft, as with the blade.

Advantageous Effects of Invention

As described above, the stirrer for manufacturing glass according to the present invention has a blade including a rod-shaped body arranged on a shaft spirally. At the time of stirring molten glass having high viscosity, stirring operation is more enhanced and load applied to the blade is also reduced, as compared with conventional various types of stirrers. In addition, by achieving an appropriate joining state with the shaft while using strengthened platinum or a strengthened platinum alloy as a constituent material of the blade, it is possible to increase the size of the blade and achieve a firm fixing state of the blade with the shaft.

DESCRIPTION OF EMBODIMENTS

Figure 1:
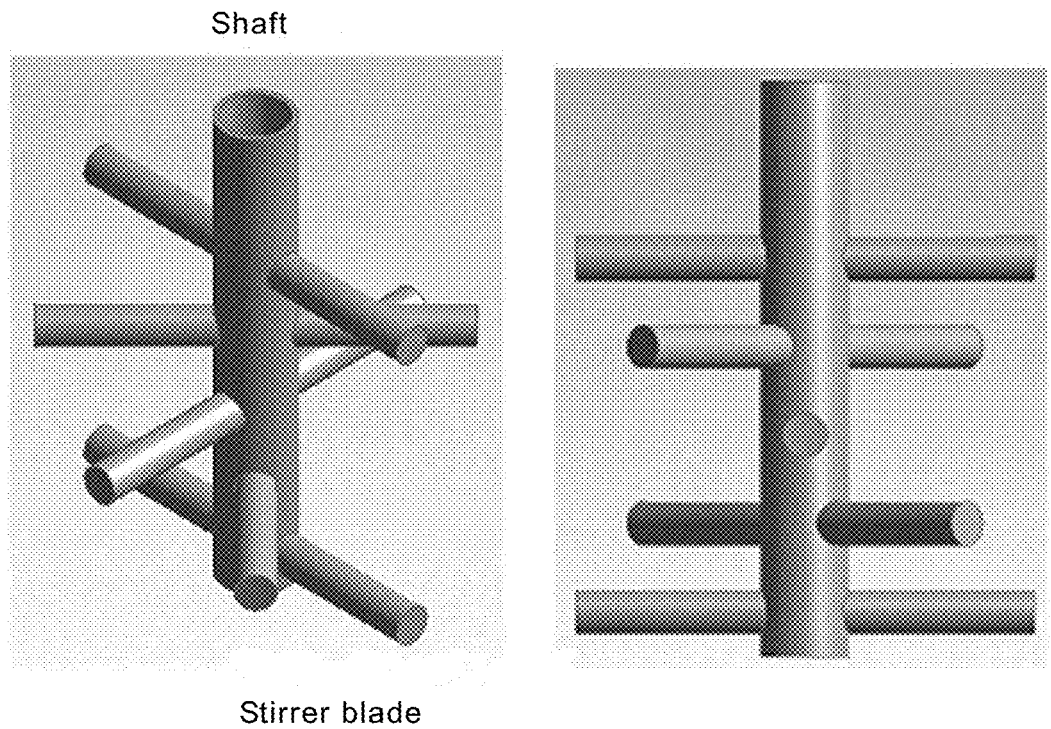
FIG. 1 illustrates a mode of a stirrer for manufacturing glass according to the present invention.
Figure 2:
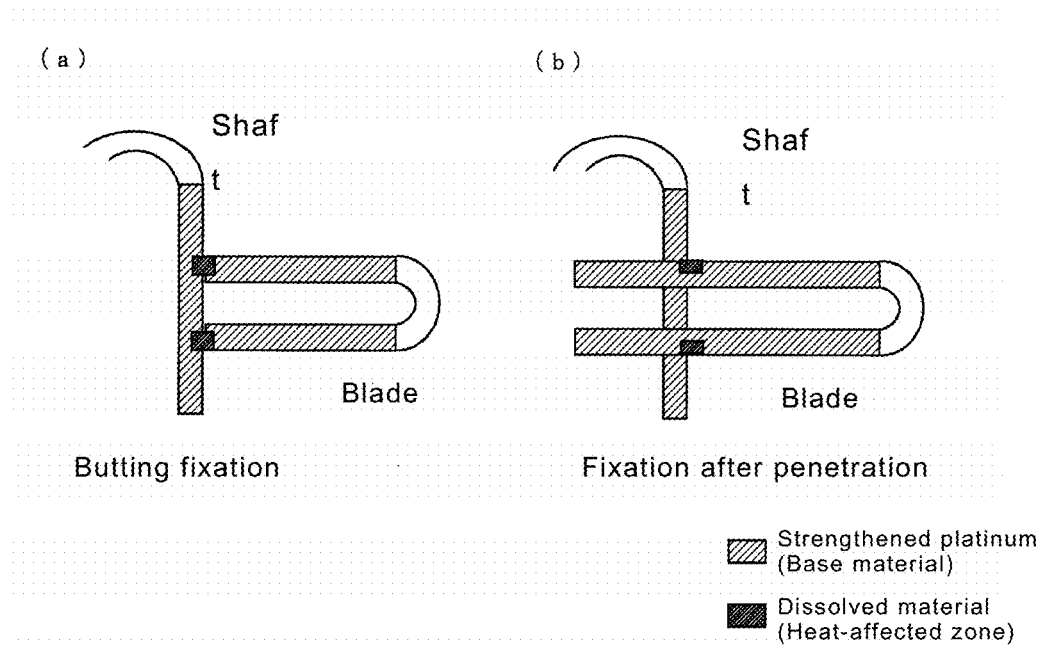
FIG. 2 illustrates a fixing state between a blade and a shaft according to a conventional product and the present invention.

Hereinbelow, a preferred embodiment according to the present invention will be described. In this embodiment, a stirrer for manufacturing glass illustrated in FIG. 1 was manufactured to check a stirring effect of this stirrer. A through hole for a blade to be penetrated through was created on a stirrer shaft (thickness of 2.0 mm, diameter of 3 cm, and length of 60 cm) including a hollow pipe made of strengthened platinum, and a stirrer blade was penetrated through the through hole. The blade is a pipe (diameter of 1.5 cm and length of 15.5 cm) manufactured by rolling up a plate made of a strengthened platinum alloy and having the thickness of 1.5 mm, and seam welding a butting portion of the plate. This embodiment employs strengthened platinum in which platinum is used as a matrix, and a zirconium oxide is dispersed. Furthermore, in this embodiment, these four pipes were penetrated through a shaft to form blades (in other words, eight blades are formed). As for positions of the blades, angles between blades are constant to be 45°, and spaces between blades are set to 15 mm, with the center of cross section of the blade being a reference.

After the blades are penetrated through the shaft, the base portion (space between the through hole and the blade) of each of the blades is seam welded to fix them. The heat-inputted amount was adjusted so that the depth of a heat-affected zone is 1.2 mm in cross section of the welded portion of the blade. As a result of this welding, a strengthened structure (grain dispersed structure) disappeared from the surface to the depth of 1.2 mm of the plate material that forms the blade, but a strengthened structure still existed in the remaining thickness of 0.3 mm. Through penetration and welding of the blades, a stirrer (blade length of 6.25 cm) in FIG. 1 was manufactured.

Figure 3:
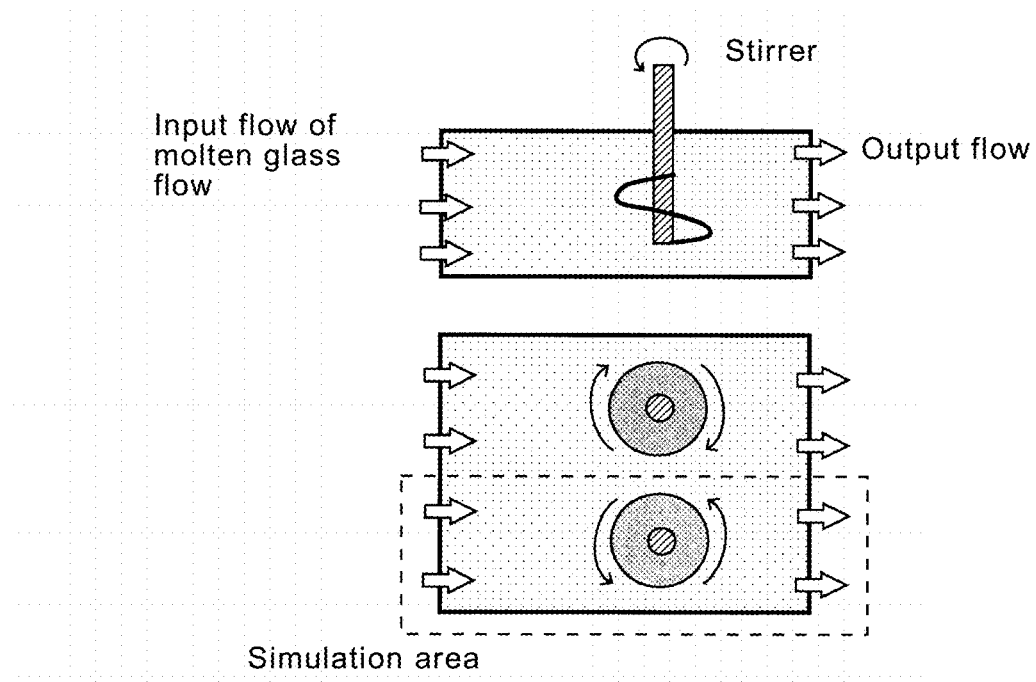
FIG. 3 illustrates an arrangement state of a stirring tank and a stirrer used in a simulation.
Figure 4:
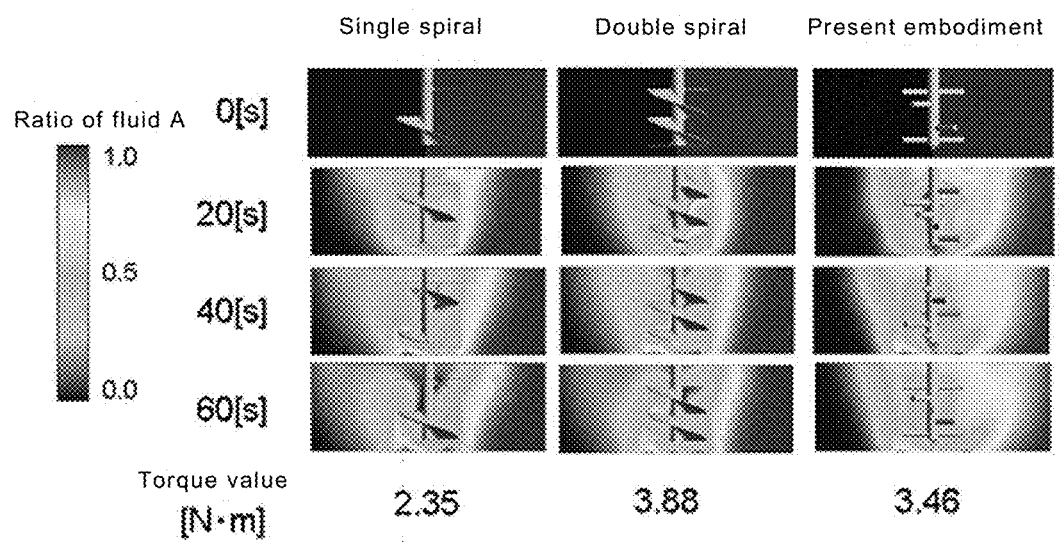
FIG. 4 illustrates stirring states of molten glass, which are simulation results.
Figure 5:
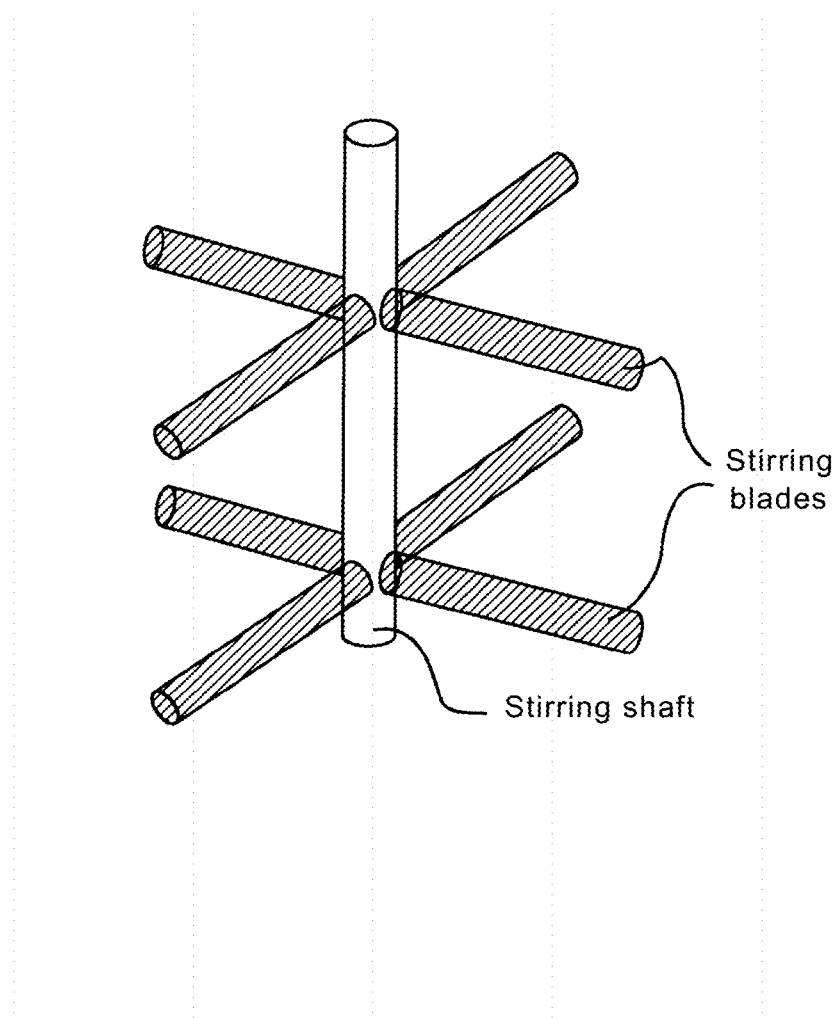
FIG. 5 illustrates a stirrer for manufacturing glass having conventional rod-shaped blades applied to the stirrer.
Figure 6:
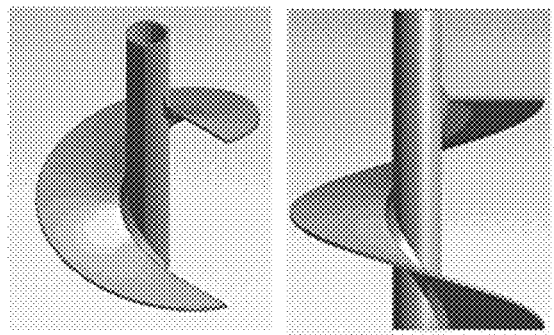
FIG. 6 illustrates a stirrer for manufacturing glass having a conventional spiral plate-shaped blade.
Figure 6:
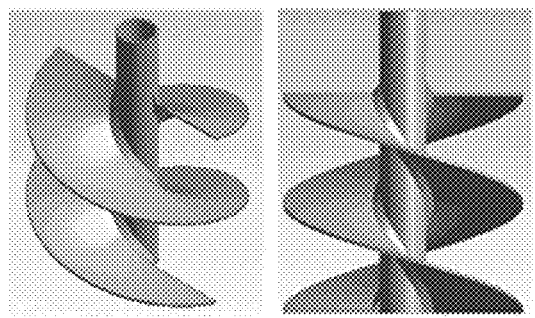
Figure 7:
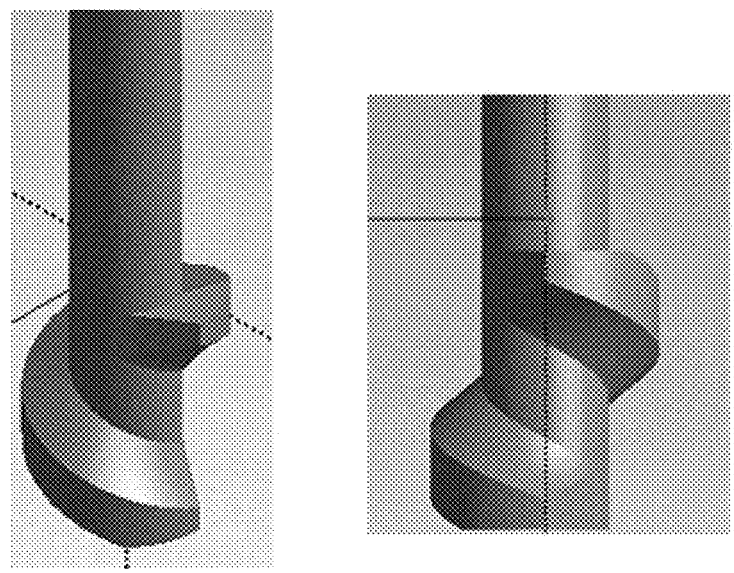
FIG. 7 illustrates a stirrer for manufacturing glass having a conventional flange-shaped blade applied to the stirrer.

Simulations were performed to the manufactured stirrer in terms of stirring of molten glass, and stirring operation was checked. These simulations were performed using commercially available simulation software (product name: ANSYS CFX made by Ansys Japan). The simulations were performed by installing two stirrers in a stirring tank as illustrated in FIG. 3, and simulating stirring states in the vicinity of one of the stirrers at the time of stirring molten glass flow, and torque values of the shaft. Simulation conditions were set such that temperatures of molten glass flow were 1300° C.±50° C., viscosity was 400 Pa·s, the space between the two stirrers was 20 cm, and the molten glass flow hit the stirrer shaft at a right angle. Furthermore, the rotating speed of each of the stirrers was 10 rpm (the speed at the top end of the blade was approximately 500 cm per minute) in a direction in which the molten glass flow is wound. Note that, for the purposes of comparison, these simulations were also performed to a stirrer having a conventional spiral blade (2.0 mm in thickness×6.25 cm in width×14 cm in length). FIG. 4 illustrates results of these simulations in a mixed state 60 seconds elapsed since the start of stirring.

In FIG. 4, white portions represent a portion having a high stirring effect. In the case of stirrer of this embodiment, the stirred area reaches twice or more times as large as the blade length of the blade, and areas having higher stirring effect extend in upper steps. Thus, it can be understood that the stirrer of this embodiment has the highest stirring effect. As for comparative examples, it can be said that stirring effect increases in some degree by increasing the blade from single to double. However, torque values sharply increase by the increase in blade. In this embodiment, although the shape of the stirring effect is analogue to that of a comparative example, which has double spirals, a torque value is lower than that of this comparative example, and is approximately between that of single one and that of double one. From these results, it can be understood that the stirrer of this embodiment has reduced load (torque) while achieving the maximum stirring effect.

In addition, in this embodiment, when blades are penetrated through and welded to the shaft, these works are performed so that a core layer having a grain dispersed structure of strengthened platinum remains in the base portion of the blade. In the simulations described above, stress acting on a root portion (fixing portion with the shaft)

of the uppermost blade was calculated for the stirrer of this embodiment to estimate breakage time.

Figure 8:
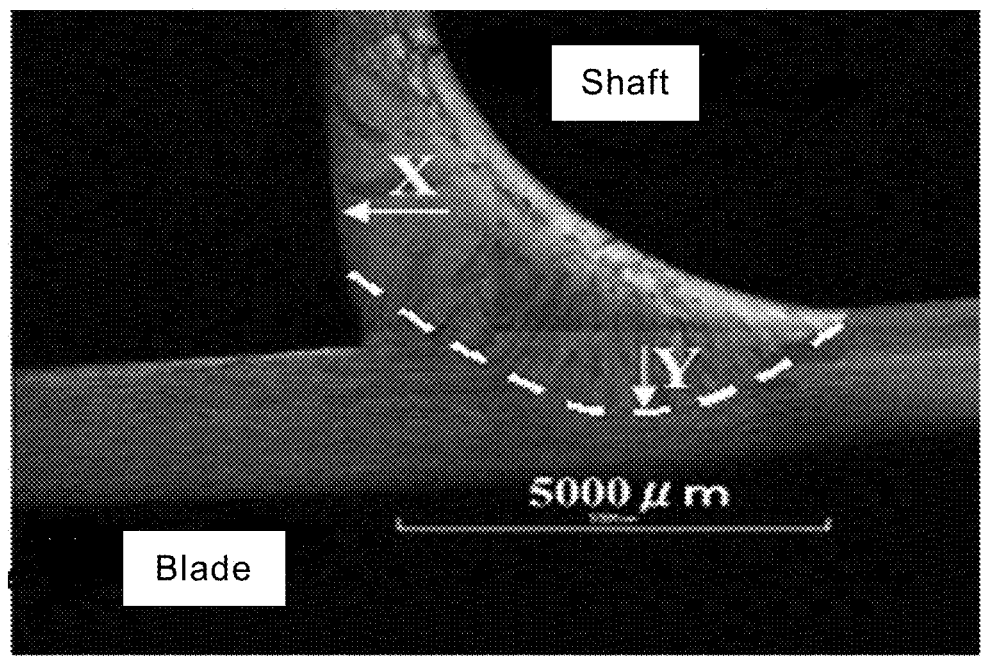
FIG. 8 is a photograph showing a cross-section of a blade connecting portion of a stirrer for manufacturing glass according to this embodiment.

FIG. 8 illustrates cross section of a joining portion of the blade and the shaft according to this embodiment. The blade is a pipe having the thickness of 1.5 mm, and has a core layer of 0.3 mm. In other words, the blade is a composite member including a platinum alloy (platinum—10 mass % of rhodium alloy) of 1.2 mm and strengthened platinum of 0.3 mm. As a result of simulations of this embodiment, stress load of 3.7 MPa acts on the root portion of the uppermost blade, and breakage time due to this load reaches 400,000 hours or longer only with the strengthened platinum portion (0.3 mm) described above. On the other hand, in the case where the root portion of the blade is fully welded, in other words, in the case where heat-affected structures (platinum alloy) are created on the entire plate thickness of the pipe, breakage time resulted in 362 hours. Thus, by leaving a core layer even if its amount is slight, it is possible to significantly increase durability of the blade.

INDUSTRIAL APPLICABILITY

The stirrer for manufacturing glass according to the present invention has high stirring operation and exhibits excellent durability even at the time of stirring molten glass having high viscosity. The present invention can be used to homogenize glass melt at the time of manufacturing glass, in particular, in manufacturing glass pane for LCD, OLED or plasma display, or during a time when glass ceramics, borosilicate glass, optical glass, or glass tubes are manufactured.

The invention claimed is:

1. A stirrer for manufacturing glass, comprising a stirrer shaft and a plurality of rod-shaped stirrer blades penetrating through and fixed to the stirrer shaft, wherein
each of the rod-shaped stirrer blade is a hollow cylindrical body comprising:
a cylinder obtained by seam welding of two opposing sides of a flat plate made of (i) strengthened platinum containing platinum as a matrix and metallic oxide dispersed in the plate or (ii) a strengthened platinum alloy containing a platinum alloy as a matrix and metallic oxide dispersed in the plate; and
a disk welded to an entire circumference of both ends of the cylinder and made from an identical material,
wherein each of the rod-shaped stirrer blades penetrates through the stirrer shaft so that a weld line due to the seam welding crosses a center axis of the stirrer shaft, and is fixed so that the end portions of the respective blades follow a spiral around the stirrer shaft,
the stirrer shaft having the rod-shaped stirrer blades welded at the root portion of each stirrer blade,
each of the rod-shaped stirrer blades has a core layer within the walls of the cylinder having the matrix and metallic oxide dispersed structure, wherein the core layer has not been thermally affected by welding.

2. The stirrer for manufacturing glass according to claim 1, wherein the stirrer blades are fixed at intervals of 10 to 20 mm.

3. The stirrer for manufacturing glass according to claim 1, wherein the number of stirrer blades is 4 to 10.

4. The stirrer for manufacturing glass according to claim 1, wherein the stirrer blade has a core layer having a thickness of 0.1 to 1.0 mm on average.

5. The stirrer for manufacturing glass according to claim 1, wherein the strengthened platinum or strengthened platinum alloy constituting the stirrer blade has a zirconium oxide or an yttrium oxide dispersed in the blade as a dispersed metallic oxide.

6. The stirrer for manufacturing glass according to claim 1, wherein the strengthened platinum alloy constituting the stirrer blade has a platinum-rhodium alloy or a platinum-gold alloy as a matrix and contains a metallic oxide dispersed in the blade.

7. The stirrer for manufacturing glass according to claim 2, wherein the number of stirrer blades is 4 to 10.

8. The stirrer for manufacturing glass according to claim 2, wherein the stirrer blade has a core layer having a thickness of 0.1 to 1.0 mm on average.

9. The stirrer for manufacturing glass according to claim 3, wherein the stirrer blade has a core layer having a thickness of 0.1 to 1.0 mm on average.

10. The stirrer for manufacturing glass according to claim 2, wherein the strengthened platinum or strengthened platinum alloy constituting the stirrer blade has a zirconium oxide or an yttrium oxide dispersed in the blade as a dispersed metallic oxide.

11. The stirrer for manufacturing glass according to claim 3, wherein the strengthened platinum or strengthened platinum alloy constituting the stirrer blade has a zirconium oxide or an yttrium oxide dispersed in the blade as a dispersed metallic oxide.

12. The stirrer for manufacturing glass according to claim 4, wherein the strengthened platinum or strengthened platinum alloy constituting the stirrer blade has a zirconium oxide or an yttrium oxide dispersed in the blade as a dispersed metallic oxide.

13. The stirrer for manufacturing glass according to claim 2, wherein the strengthened platinum alloy constituting the stirrer blade has a platinum-rhodium alloy or a platinum-gold alloy as a matrix and contains a metallic oxide dispersed in the blade.

14. The stirrer for manufacturing glass according to claim 3, wherein the strengthened platinum alloy constituting the stirrer blade has a platinum-rhodium alloy or a platinum-gold alloy as a matrix and contains a metallic oxide dispersed in the blade.

15. The stirrer for manufacturing glass according to claim 4, wherein the strengthened platinum alloy constituting the stirrer blade has a platinum-rhodium alloy or a platinum-gold alloy as a matrix and contains a metallic oxide dispersed in the blade.

16. The stirrer for manufacturing glass according to claim 5, wherein the strengthened platinum alloy constituting the stirrer blade has a platinum-rhodium alloy or a platinum-gold alloy as a matrix and contains a metallic oxide dispersed in the blade.

* * * * *